United States Patent
Kang et al.

(10) Patent No.: US 11,089,077 B2
(45) Date of Patent: Aug. 10, 2021

(54) APPARATUS AND METHOD FOR PROVIDING CALL QUALITY INFORMATION

(71) Applicant: LINE Plus Corporation, Seongnam-si (KR)

(72) Inventors: In Gyu Kang, Seongnam-si (KR); Hun Kwang Ha, Seongnam-si (KR); Sanghyuk Suh, Seongnam-si (KR)

(73) Assignee: LINE PLUS CORPORATION, Seongnam-si (KR)

( * ) Notice: Subject to any disclaimer, the term of this patent is extended or adjusted under 35 U.S.C. 154(b) by 15 days.

(21) Appl. No.: 16/569,069

(22) Filed: Sep. 12, 2019

(65) Prior Publication Data
US 2020/0092347 A1 Mar. 19, 2020

(30) Foreign Application Priority Data
Sep. 13, 2018 (KR) .................. 10-2018-0109732

(51) Int. Cl.
H04L 29/06 (2006.01)
(52) U.S. Cl.
CPC .......... *H04L 65/80* (2013.01); *H04L 65/607* (2013.01)
(58) Field of Classification Search
CPC ..... H04L 65/60; H04L 65/601; H04L 65/602; H04L 65/604; H04L 65/605; H04L 65/607; H04L 65/80
See application file for complete search history.

(56) References Cited

U.S. PATENT DOCUMENTS

| | | | | |
|---|---|---|---|---|
| 5,518,408 A | * | 5/1996 | Kawashima | G09B 15/00 434/307 A |
| 5,835,495 A | * | 11/1998 | Ferriere | H04L 65/80 370/465 |
| 10,008,913 B2 | * | 6/2018 | Hessdoerfer | H02K 23/38 |
| 2002/0188745 A1 | * | 12/2002 | Hughes | H04L 29/06027 709/231 |
| 2006/0120350 A1 | * | 6/2006 | Olds | H04L 65/607 370/352 |
| 2007/0294415 A1 | * | 12/2007 | Kelder | H04M 7/0063 709/227 |
| 2008/0205386 A1 | * | 8/2008 | Purnadi | H04W 48/18 370/389 |
| 2009/0089849 A1 | * | 4/2009 | Jefremov | H04N 21/4223 725/118 |
| 2011/0141925 A1 | * | 6/2011 | Velenko | H04L 67/104 370/252 |
| 2011/0161087 A1 | * | 6/2011 | Ashley | G10L 19/24 704/500 |
| 2017/0111496 A1 | * | 4/2017 | Chandrasekaran | H04L 65/80 |
| 2017/0372708 A1 | * | 12/2017 | Chebiyyam | G10L 19/008 |
| 2019/0253303 A1 | * | 8/2019 | Caron | H04L 29/06197 |

FOREIGN PATENT DOCUMENTS

KR 10-0546013 1/2006

* cited by examiner

*Primary Examiner* — Kevin D Mew
(74) *Attorney, Agent, or Firm* — Staas & Halsey LLP

(57) ABSTRACT

Provided is a method of performing a call by decoding an encoded call signal from a transmitting terminal at a desired reference sampling rate, by resampling the decoded call signal at a sampling rate supported by an outputter, and by outputting the resampled call signal through the outputter, and generating and providing information on a bandwidth used for the call based on bandwidth information on the encoded call signal, the reference sampling rate, and the sampling rate supported by the outputter.

16 Claims, 11 Drawing Sheets

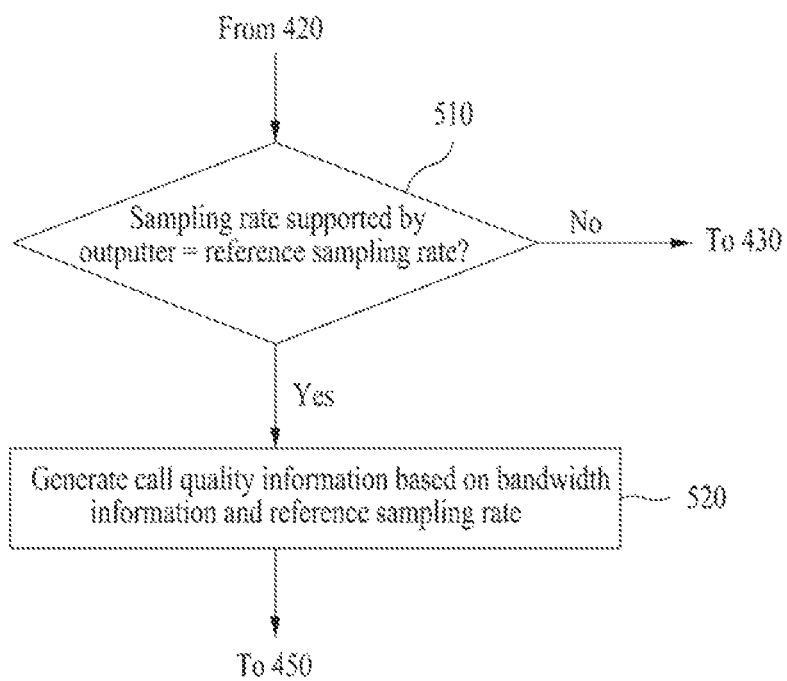

APPARATUS AND METHOD FOR PROVIDING CALL QUALITY INFORMATION

CROSS-REFERENCE TO RELATED APPLICATION(S)

This U.S. non-provisional application claims the benefit of priority under 35 U.S.C. § 119 to Korean Patent Application No. 10-2018-0109732 filed on Sep. 13, 2018, in the Korean Intellectual Property Office (KIPO), the entire contents of which are incorporated herein by reference.

BACKGROUND

Field

One or more example embodiments relate to a method of providing call quality information, and more particularly, to a method of providing call quality information accurately indicating a corresponding call quality to a receiving terminal and a transmitting terminal.

Description of Related Art

Various types of terminals providing a call function, such as voice over Internet protocol (VoIP), between user terminals are currently in the market. Such a terminal may support a voice call and a video call, and a user of the terminal may communicate with another user or may exchange content/information through the call function. The call function may be provided through an application installed on the terminal.

Meanwhile, a quality of call may vary based on specifications or characteristics of an inputter included in or connected to a transmitting terminal and configured to receive a call signal, such as an audio signal, or specifications or characteristics of an outputter included in or connected to a receiving terminal and configured to output a call signal, as well as a state of a network in which the call is performed.

Accordingly, there is a need for a method of generating and providing call quality information capable of reflecting a further accurate call quality by collectively considering characteristics of a receiving terminal and a transmitting terminal, instead of simply providing call quality information on a call between the receiving terminal and the transmitting terminal based on a state of a network.

The aforementioned information is merely provided to help understanding and may include content that is not included in a portion of the related art and may include content that may be offered to those skilled in the art.

SUMMARY

One or more example embodiments provide a method that may generate call quality information based on bandwidth information on an encoded call signal received from a transmitting terminal, a reference sampling rate for decoding the received encoded call signal, and a sampling rate supported by an outputter configured to output the call signal and may display the generated call quality information.

One or more example embodiments also provide a method that may display information on a call quality related to a bandwidth used for a call between a transmitting terminal and a receiving terminal based on a sampling rate supported by an inputter of the transmitting terminal configured to receive a call signal and a sampling rate supported by an outputter of the receiving terminal configured to output the call signal.

According to an aspect of at least one example embodiment, there is provided a method of providing call quality information at a receiving terminal, the method including, by a receiving terminal, receiving an encoded call signal and bandwidth information on the encoded call signal from a transmitting terminal; decoding the received encoded call signal at a first reference sampling rate; resampling the decoded call signal at a sampling rate supported by an outputter that is included in or connected to the receiving terminal to output the resampled call signal from the receiving terminal; and generating call quality information based on at least one of the bandwidth information, the first reference sampling rate, and the sampling rate supported by the outputter.

The receiving may include receiving the call signal that is a signal having been generated by sampling an input signal input through an inputter, included in or connected to the transmitting terminal to input the input signal to the transmitting terminal, at a second reference sampling rate and by encoding the sampled input signal, and the bandwidth information is based on the second reference sampling rate and a sampling rate supported by the inputter.

The receiving may include receiving the encoded call signal that is a signal having been generated by decoding content prestored in the transmitting terminal or provided from an external content provider to the transmitting terminal, sampling the decoded content at a second reference sampling rate, and encoding the sampled content, and the bandwidth information is based on the second reference sampling rate and a sampling rate at which the content is decoded.

The bandwidth information may include information on a smaller bandwidth between a bandwidth indicated by the second reference sampling rate and a bandwidth indicated by the sampling rate supported by the inputter.

The bandwidth information may include information regarding a wideband (WB), information regarding a super-wideband (SWB), or information regarding a full band (FB).

When the sampling rate supported by the outputter is different from the first reference sampling rate, the call quality information may include information on a minimum bandwidth among a first bandwidth indicated by the bandwidth information, a second bandwidth indicated by the first reference sampling rate, and a third bandwidth indicated by the sampling rate supported by the outputter.

When the sampling rate supported by the outputter is identical to the first reference sampling rate, the call quality information may include information on a smaller bandwidth between the first bandwidth and the second bandwidth.

The call quality information providing method may further include, by the receiving terminal, outputting the resampled call signal through the outputter; and displaying the call quality information.

The displayed call quality information may include information on a call quality related to a bandwidth used for a call between the transmitting terminal and the receiving terminal.

The receiving terminal may further determine whether the sampling rate supported by the outputter is different from the first sampling rate, and the resampling may be performed in response to it being determined that the sampling rate supported by the outputter is different from the first reference sampling rate.

The first reference sampling rate may be based on at least one of a performance of the receiving terminal and a setting of a service provider that provides a call between the transmitting terminal and the receiving terminal.

According to another aspect of at least one example embodiment, there is provided an electronic device for providing call quality information, the electronic device including at least one memory and at least one processor coupled to the at least one memory to perform a process including: receiving an encoded call signal and bandwidth information on the call signal from a transmitting terminal; decoding the received encoded call signal at a first reference sampling rate; resampling the decoded call signal at a sampling rate supported by an outputter that is associated with the electronic device to output the resampled call signal from the electronic device; and generating call quality information based on at least one of the bandwidth information, the first reference sampling rate, and the sampling rate supported by the outputter.

According to another aspect of at least one example embodiment, there is provided a method of providing call quality information at a transmitting terminal, the method including, by a transmitting terminal: resampling an input signal at a reference sampling rate, wherein (a) the input signal having been received by the transmitting terminal from an inputter, included in or connected to the transmitting terminal to input the input signal to the transmitting terminal, and then, prior to the resampling, having been sampled at a sampling rate supported by the inputter, or (b) the input signal having been generated by decoding content prestored in the transmitting terminal or provided from an external content provider to the transmitting terminal; encoding the resampled input signal; and transmitting, to a receiving terminal, the encoded input signal and bandwidth information, wherein (i) when the input signal was received by the transmitting terminal from the inputter and then, prior to the resampling, was sampled at the sampling rate supported by the inputter, the bandwidth information is based on the reference sampling rate and the sampling rate supported by the inputter, (ii) when input signal was generated by decoding content prestored in the transmitting terminal or provided from an external content provider to the transmitting terminal, the bandwidth information is based on a sampling rate at which the content was decoded, and (iii) the encoded input signal and the bandwidth information transmitted to the receiving terminal are for use by the receiving terminal to generate information on a call quality related to a bandwidth used for a call between the transmitting terminal and the receiving terminal.

According to another aspect of at least one example embodiment, there is provided a method of providing call quality information at a receiving terminal, the method including, by a receiving terminal, receiving an encoded call signal and bandwidth information on the encoded call signal from a transmitting terminal; decoding the received encoded call signal at a first reference sampling rate; comparing a sampling rate supported by an outputter included in or connected to the receiving terminal to the first reference sampling rate; in response to the comparing indicating that the sampling rate supported by the outputter is different from the first reference sampling rate, resampling the decoded call signal at the sampling rate supported by the outputter and generating call quality information based on the first reference sampling rate and the sampling rate supported by the outputter, wherein the outputter is to output the resampled call signal from the receiving terminal; and, in response to the comparing indicating that the sampling rate supported by the outputter is identical to the first reference sampling rate, generating the call quality information based on the bandwidth information and the first reference sampling rate.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 5 is a flowchart illustrating an example of a method of providing call quality information at a receiving terminal according to at least one example embodiment;

Figure 1:
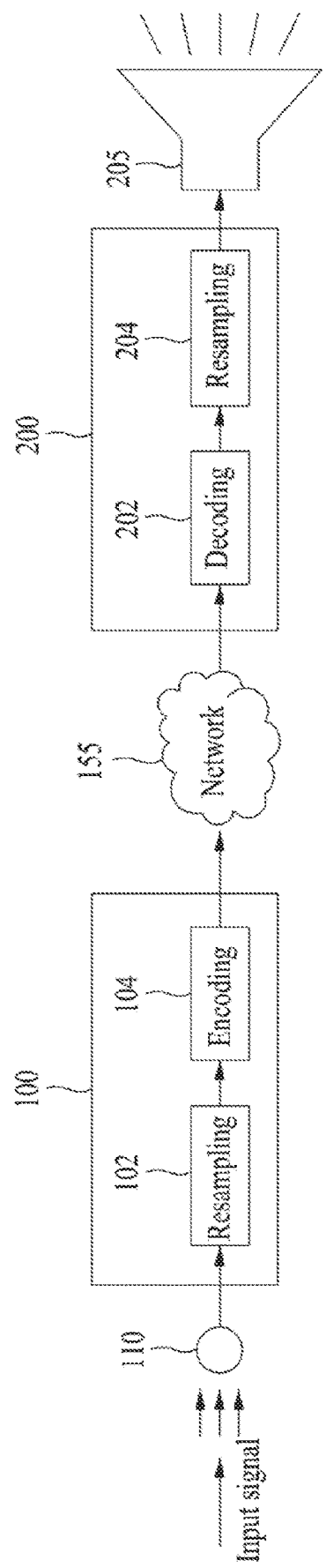
FIG. 1 illustrates an example of a call method between a transmitting terminal and a receiving terminal according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable record media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable record media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable record media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings. Like reference numerals illustrated in the respective drawings refer to like elements throughout.

In the following description, for clarity of description, a function and/or operation performed by an electronic device (or a user terminal), or a component included therein may be described to be performed by an upper component including the corresponding component or the electronic device (or the user terminal) itself.

A method of providing information on a call quality (also referred to as call quality information) according to example embodiments may be configured through an electronic device, for example, a transmitting terminal 100 and a receiving terminal 200, which is described below, and may be performed by the electronic device. For example, an application configured as a computer program to perform the method according to the example embodiments on the electronic device may be installed and executed on the electronic device, and the electronic device may perform the method of providing call quality information under control of the executed application.

In the following description, a sampling rate may be a Nyquist sampling rate. A sampling rate of a call signal, for example, an audio signal, may be associated with a bandwidth of the corresponding call signal. That is, the bandwidth may be determined based on the sampling rate of the call signal.

The bandwidth of the call signal may be a narrowband (NB) (100-4000 hertz (Hz)), wideband (WB) (50-8000 Hz), super-wideband (SWB) (50-16000 Hz), or a full band (FB) (50-20000 Hz or more). Here, the highest sound quality is provided in the full band and the lowest sound quality is provided in the narrowband. For example, if a sampling rate of a call signal is 16000 sample/s (hereinafter, unit is omitted) or less, a bandwidth of the corresponding call signal may be a wideband. Alternatively, if the sampling rate of the call signal is above 16000 and 32000 or less, the bandwidth of the call signal may be a super-wideband. Alternatively, if the sampling rate of the call signal is above 32000, the bandwidth of the call signal may be a full band.

FIG. 1 illustrates an example of a call method between a transmitting terminal and a receiving terminal according to at least one example embodiment.

Hereinafter, a method of performing a call between a transmitting terminal 100 and a receiving terminal 200 over a network 155 is described with reference to FIG. 1.

The call between the transmitting terminal 100 and the receiving terminal 200 may be, for example, a voice over Internet protocol (VoIP)-based call. The call between the transmitting terminal 100 and the receiving terminal 200 may be a voice call for transmitting and receiving an audio signal. Alternatively, the call may be a video call for further transmitting and receiving a video call with an audio signal.

Also, the transmitting terminal 100 and the receiving terminal 200 may transmit and receive content through the call function. The content may be, for example, at least one of an image, a video, and a text, an emoticon, and a sticker.

The call function of providing a call between the transmitting terminal 100 and the receiving terminal 200 may be provided through an application or a program installed on each of the transmitting terminal 100 and the receiving terminal 200. The application may be, for example, an application that provides a VoIP-based call or a messenger application that provides a function of allowing a chat or a messenger to be transmitted and received between the transmitting terminal 100 and the receiving terminal 200. That is, a user of the transmitting terminal 100 and a user of the receiving terminal 200 may communicate with each other through a voice call function and/or a video call function provided through the application.

Each of the transmitting terminal 100 and the receiving terminal 200 may be, for example, the same type of a user terminal, for example, a smartphone. The network 155 may be, for example, the Internet. Alternatively, the network 155 may include a network topology that includes at least one of a personal area network (PAN), a local area network (LAN), a campus area network (CAN), a metropolitan area network (MAN), a wide area network (WAN), a broadband network (BBN), and the Internet.

Although not illustrated, a call between the transmitting terminal 100 and the receiving terminal 200 may be performed in association with a server or through the server. For example, a call between the transmitting terminal 100 and the receiving terminal 200 may be performed in association with a server of a service provider that provides a corresponding call function, such as, for example, a messenger service providing server and a VoIP-based call providing server.

The transmitting terminal 100 may receive, from the user, an input signal that is input through an inputter 105 connected to or included in the transmitting terminal 100. The input signal may be, for example, an audio signal such as a voice input from the user. The input signal before passing the inputter 105 may be an analog signal. The inputter 105 may be, for example, a microphone, and may be included in the transmitting terminal 100, although not illustrated.

The input signal input to the transmitting terminal 100 through the inputter 105 may be a digital signal that is sampled at a sampling rate supported by the inputter 105. The transmitting terminal 100 may resample the received input signal at a predetermined (or, alternatively, desired) reference sampling rate in operation 102, may encode the resampled input signal in operation 104, and may output the encoded input signal through the network 155. The output signal may be transmitted to the receiving terminal 200.

The receiving terminal 200 may decode the received encoded call signal, that is, the signal that is encoded and thereby output from the transmitting terminal 100 through the network 155, at a predetermined (or, alternatively, desired) reference sampling rate in operation 202, and may resample the decoded call signal at a sampling rate supported by an outputter 205 connected to or included in the receiving terminal 200 in operation 204. The outputter 205 may be, for example, a speaker, and may be included in the receiving terminal 200, although not illustrated. The outputter 205 may receive and output the decoded resampled call signal from the receiving terminal 200. For example, the outputter 205 may convert the received digital call signal to an analog call signal and may output the converted analog call signal.

The receiving terminal 200 may generate call quality information on a call quality of a call with the transmitting terminal 100 based on at least one of bandwidth information on the call signal received from the transmitting terminal 100, the reference sampling rate, and the sampling rate supported by the outputter 205. The receiving terminal 200 may display the generated call quality information. For example, the call quality information may be displayed on a call screen user interface of the receiving terminal 200.

The call quality information may include information on a bandwidth being used for a current call. Accordingly, compared to call quality information merely based on a state of the network 155, call quality information capable of further accurately determining a call state and quality between the receiving terminal 200 and the transmitting terminal 100 may be provided to the user.

The call is performed by consecutively transmitting and receiving a call signal between the transmitting terminal 100 and the receiving terminal 200. On the contrary to the illustrated drawing, when the transmitting terminal 100 receives a call signal from the receiving terminal 200, the transmitting terminal 100 may operate in a similar manner to the receiving terminal 200 and the receiving terminal 200 may operate in a similar manner to the transmitting terminal 100. Here, the transmitting terminal 100 may generate call quality information and may display the generated call quality information, which is similar to the aforementioned receiving terminal 200.

Accordingly, call quality information according to the example embodiment may be generated at any of the transmitting terminal 100 and the receiving terminal 200 and may be displayed on the respective corresponding terminal.

Functions and operations of the transmitting terminal 100 and the receiving terminal 200, and a method of generating and providing call quality information are further described with reference to FIGS. 2 to 8.

Figure 2:
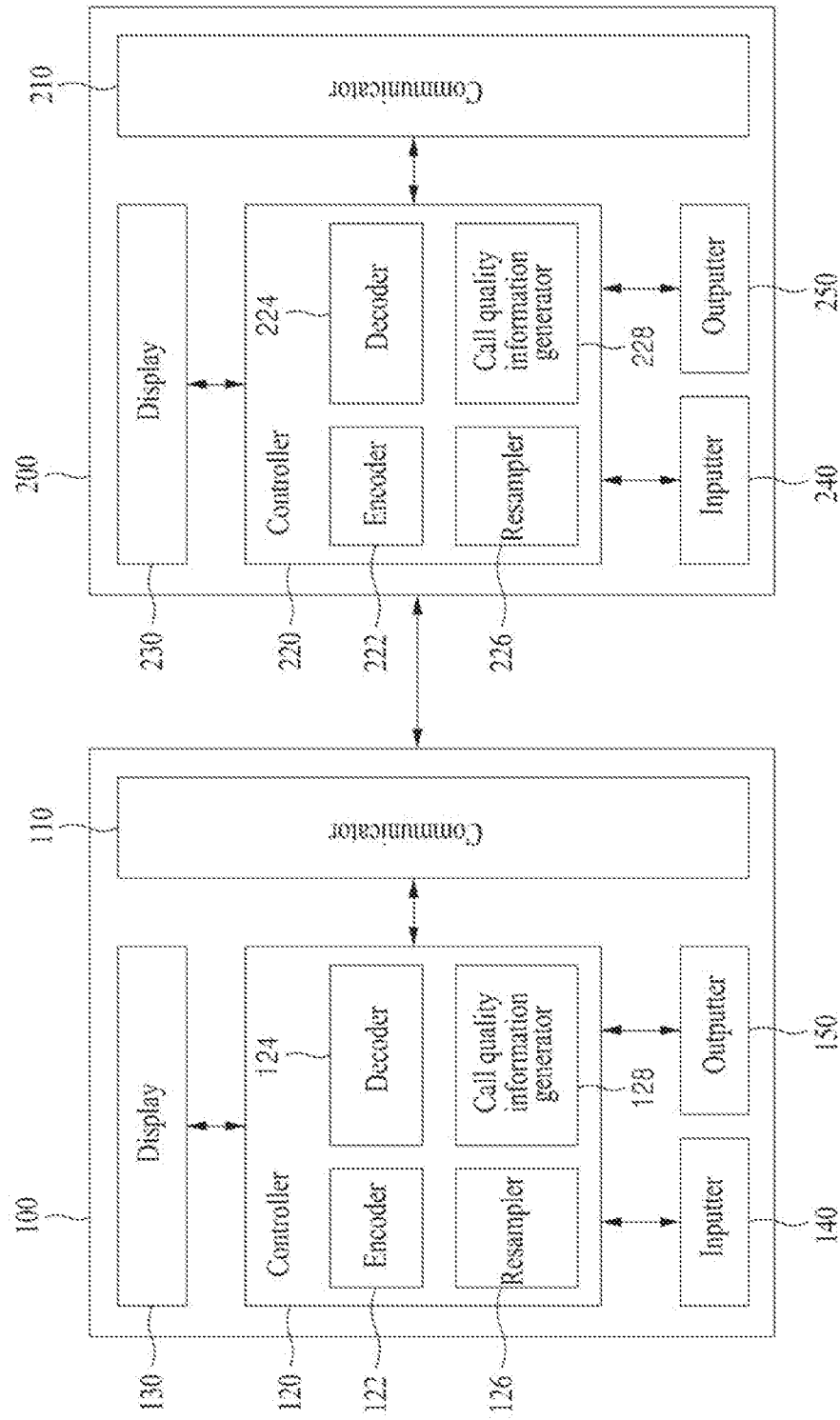
FIG. 2 is a diagram illustrating an example of components of a transmitting terminal and a receiving terminal that perform a call according to at least one example embodiment.

FIG. 2 is a diagram illustrating an example of components of a transmitting terminal and a receiving terminal that perform a call according to at least one example embodiment.

Components of the transmitting terminal 100 and the receiving terminal 200 of FIG. 1 and operations thereof are further described. Each of the transmitting terminal 100 and the receiving terminal 200, as an electronic device, may be a smartphone supporting a call function or a device similar thereto. Also, the electronic device may be a user terminal, for example, a personal computer (PC), a notebook (laptop computer), a laptop computer, a tablet, an Internet of Things (IoT) device, and a wearable computer.

As described above, the transmitting terminal 100 and the receiving terminal 200 may be the same type of electronic devices, and may include the same or similar components and may perform both transmitting terminal and receiving terminal functionalities in terms of making a call. Hereinafter, functions and operations of components are described based on the receiving terminal 200, and repetitive description related to the transmitting terminal 100 is omitted. Herein, the transmitting terminal 100 may also be simply referred to as the terminal 100 and the receiving terminal 200 may also be simply referred to as the terminal 200.

Referring to FIG. 2, the terminal 200 may include a communicator 210, a controller 220, and a display 230.

Also, the terminal 200 may connect to or may include an inputter 240 and an outputter 250.

When the terminal 200 serves as a receiving terminal during a call, the terminal 200 may include the inputter 240 configured to receive an input signal from a caller. The inputter 240 may be, for example, a microphone of the terminal 200. The terminal 200 may include a plurality of inputters 240. For example, the terminal 200 may include a microphone used for a general call and a microphone used in response to execution of a speaker phone function. Alternatively, although not illustrated, the inputter 240 may be configured to connect to the terminal 200, instead of being included in the terminal 200. For example, the inputter 240 may be a microphone connected to the terminal 200 or may be a portion of an earphone including a headset, a hands-free, or a microphone.

Also, when the terminal 200 serves as a transmitting terminal during a call, the terminal 200 may include the outputter 250 configured to output a call signal. The outputter 250 may be, for example, a speaker of the terminal 200. The terminal 200 may include a plurality of outputters 250. For example, the terminal 200 may include a speaker used for a general call and a speaker used in response to execution of a speaker phone function. Alternatively, although not illustrated, the outputter 250 may be configured to connect to the terminal 200, instead of being included in the terminal 200. For example, the outputter 250 may be a speaker, an earphone, or a headphone connected to the terminal 200 or may be a portion of an earphone including a headset, a hands-free, or a microphone.

The communicator 210 may be a device for communication between the terminal 200 and another electronic device, for example, the terminal 100 or a server. That is, the communicator 210 may be a hardware module, such as a network interface card, a network interface chip, and a networking interface port of the terminal 200, configured to transmit/receive data and/or information to/from the other electronic device or the server, or a software module, such as a network device or a networking program.

When the terminal 200 serves as a receiving terminal, the communicator 210 may receive an encoded call signal (including bandwidth information on the corresponding call signal) from the transmitting terminal 100. When the terminal 200 serves as a transmitting terminal, the communicator 210 may output the encoded call signal over a network.

The controller 220 may manage components of the terminal 200 and may execute a program or an application used by the terminal 200. For example, the electronic device 100 may execute an application that provides a call function or may process data received from the server or the other electronic device.

Also, the controller 220 may process an operation required to execute the program or the application and to process data. The controller 220 may be at least one processor of the terminal 200 or at least one core within the processor.

The display 230 may include a display device as a device configured to output information or data input from the user. During a call, the display 230 may output a call screen user interface and may output, that is, display call quality information through the call screen user interface.

Although not illustrated, the electronic device 100 may include a storage as a device configured to store data or information. The storage may include any type of memories or storage devices. A program or an application executed by the controller 220 and related information or data used for communication may be stored in the storage.

Hereinafter, a method of performing a call and providing call quality information through the terminal 200 is described with reference to components 222, 224, 226, and 228 of the controller 220 of the terminal 200.

The controller 220 may include an encoder 222 configured to encode an input signal and a resampled input signal input through the inputter 240, a decoder 224 configured to decode the encoded call signal, a resampler 226 configured to resample the input signal/call signal at a predetermined (or, alternatively, desired) sampling rate, and a call quality information generator 228 configured to generate call quality information.

When the terminal 200 serves as transmitting terminal, the resampler 226 may receive the input signal from the inputter 240. The input signal may be a digital signal that is sampled at a sampling rate supported by the inputter 240. The resampler 226 may resample the input signal at a predetermined (or, alternatively, desired) reference sampling rate. The encoder 222 may encode the resampled input signal. Bandwidth information may be determined based on the encoded input signal, the reference sampling rate, and the sampling rate supported by the inputter 240, and the determined bandwidth information may be output through the communicator 210 and transmitted to a receiving terminal.

An operation method of a transmitting terminal during a call is further described with reference to FIG. 3.

Meanwhile, when the terminal 200 serves as a receiving terminal, the decoder 224 may receive the encoded call signal and bandwidth information on the call signal from a transmitting terminal through the communicator 210 and may decode the received call signal. The decoder 224 may perform decoding at a predetermined (or, alternatively, desired) reference sampling rate. The resampler 226 may resample the decoded call signal at a sampling rate supported by the outputter 250. The call quality information generator 228 may generate call quality information based on at least one of the received bandwidth information, the reference sampling rate, and the sampling rate supported by the outputter 250. The generated call quality information may be output through the display 250. The call signal resampled at the sampling rate supported by the outputter 250 may be transmitted to the outputter 250 and output.

An operation method of a receiving terminal during a call is further described with reference to FIGS. 4 and 5.

Each of the aforementioned components 222, 224, 226, and 228 of the controller 220 may be a software module or a hardware module configured on the controller 220. A method of generating and providing call quality information through the components 222, 224, 226, and 228 is further described with reference to FIGS. 3 to 8.

The description made above in relation to the terminal 200 and the components 210, 220, 230, 240, and 250 thereof may apply to the terminal 100 and components 110, 120, 130, 140, and 150 thereof. Description related to technical features made above with reference to FIG. 1 may apply to FIG. 2 and accordingly, further description is omitted.

Figure 3:
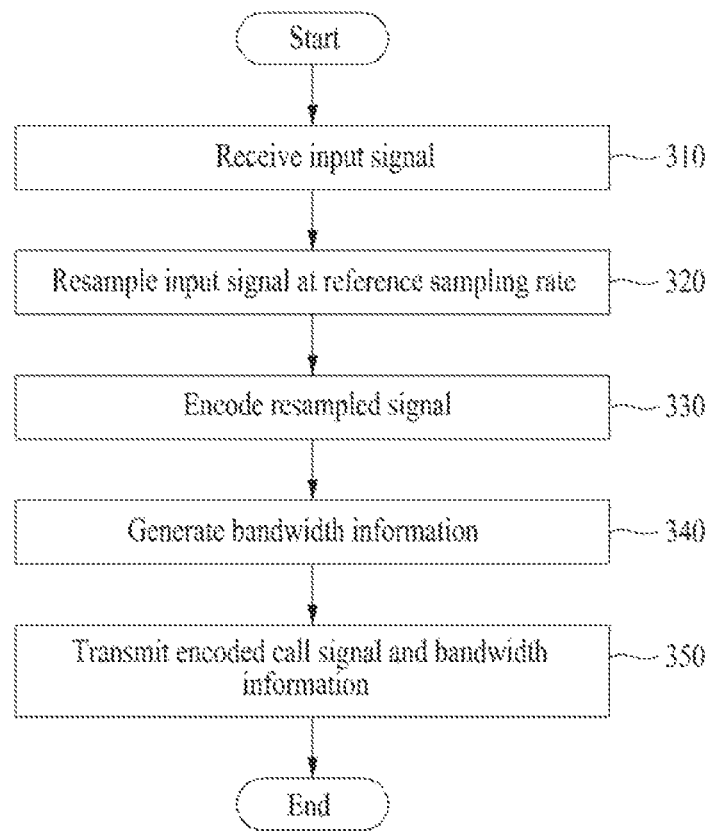
FIG. 3 is a flowchart illustrating an example of a call method for providing call quality information at a transmitting terminal according to at least one example embodiment.

FIG. 3 is a flowchart illustrating an example of a call method for providing call quality information at a transmitting terminal according to at least one example embodiment.

Referring to FIG. 3, in operation 310, the transmitting terminal 100, that is, the controller 120, may receive an input signal from an inputter 140. The input signal may be a digital signal that is sampled at a sampling rate supported by the inputter 140. That is, a signal, for example, an audio signal, input from a user, for example, a caller, or an outside to the inputter 140 may be converted to a digital signal that is sampled at the sampling rate supported by the inputter 140. Alternatively, the input signal may be prestored in the transmitting terminal 100, or content provided from an external content provider to the transmitting terminal 100 may be decoded in the input signal, which is further described with reference to FIGS. 9 and 10.

In operation 320, the resampler 126 may resample the input signal received from the inputter 140 at a predetermined (or, alternatively, desired) reference sampling rate. The reference sampling rate may be determined based on at least one of performance of the terminal 100 and a setting by a service provider that provides a call service.

When a call service between the transmitting terminal 100 and the receiving terminal 200 supports a bandwidth of at least a wideband, the reference sampling rate may be set as a value corresponding to the wideband, a super-wideband, or a full band. Here, a sampling rate value corresponding to the wideband, the super-wideband, or the full band may be set by the service provider or may be set by the user of the transmitting terminal 100 or the receiving terminal 200 performing a call, for example, a user of a side that initiates a call.

Also, the reference sampling rate may be determined based on the performance of the terminal 100. For example, although the call service supports a bandwidth of a full band, the terminal 100 may not support the bandwidth. In this example, the reference sampling rate may be determined as a sampling rate corresponding to a maximum bandwidth supported by the terminal 100.

Reference sampling rate values corresponding to the wideband, the super-wideband, and the full band may be, for example, 16000, 32000, and 48000, respectively. When the call service supports a relatively wide bandwidth, such as the full band, relatively excellent sound quality may be provided during a call. During the call, additional content as well as a voice signal may be communicable.

Resampling of operation 320 may not be performed when the sampling rate supported by the inputter 140 is identical to the reference sampling rate.

In operation 330, the encoder 122 may encode the input signal resampled in operation 320.

In operation 340, the encoder 122 may generate bandwidth information that is determined based on the encoded input signal, the reference sampling rate, and the sampling rate supported by the inputter 140, and the encoded input signal and the bandwidth information are transmitted to the receiving terminal 200 in operation 350.

Information on a bandwidth indicated by the reference sampling rate or the reference sampling rate, for example, a maximum bandwidth according to the reference sampling rate, may be set to the encoder 122. Also, the sampling rate supported by the inputter 140 or information on the sampling rate supported by the inputter 140, for example, the maximum bandwidth corresponding to the sampling rate, may be set to the encoder 122.

Accordingly, the bandwidth information of operation 340 may include information on the bandwidth that is determined based on the reference sampling rate and the sampling rate supported by the inputter 140. For example, the bandwidth information may include information on a relatively smaller bandwidth between a bandwidth indicated by the reference sampling rate and a bandwidth indicated by the sampling rate supported by the inputter 140. The bandwidth information may be generated by the encoder 122.

The bandwidth information may represent a bandwidth of, for example, a wideband (WB), a super-wideband (SWB), or a full band (FB).

The input signal encoded by the encoder 122 may be related to the bandwidth represented by the bandwidth information. That is, the encoder 122 may encode the input signal in association with the bandwidth represented by the bandwidth information on the input signal. For example, when the reference sampling rate is identical to the sampling rate supported by the inputter 140, the input signal encoded by the encoder 122 may be related to the bandwidth indicated by the reference sampling rate. Alternatively, when the reference sampling rate is different from the sampling rate supported by the inputter 140, the input signal encoded by the encoder 122 may be related to a bandwidth indicated by a relatively smaller sampling rate.

The encoded input signal and the bandwidth information transmitted to the receiving terminal 200 may be used for the receiving terminal 200 to output the call signal and to generate call quality information related to a bandwidth actually used for the call.

An operation method of a receiving terminal during a call and a method of generating and providing call quality information are further described with reference to FIGS. 4 and 5.

Description related to technical features made above with reference to FIGS. 1 and 2 may apply to FIG. 3 and accordingly, further description is omitted.

Figure 4:
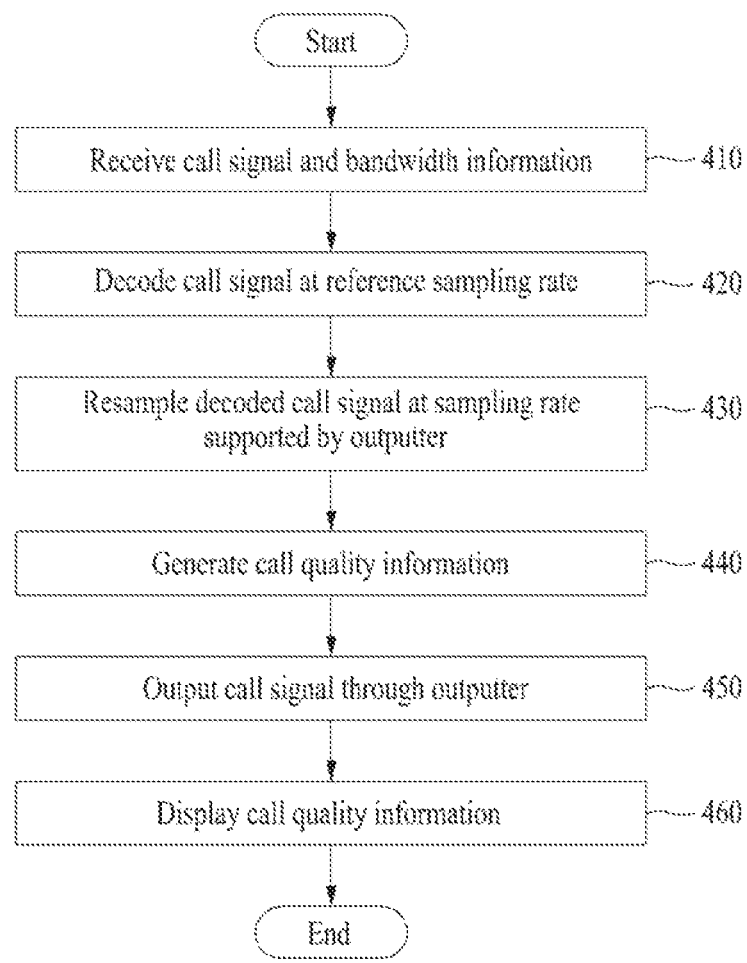
FIG. 4 is a flowchart illustrating an example of a method of providing call quality information at a receiving terminal according to at least one example embodiment.

FIG. 4 is a flowchart illustrating an example of a method of providing call quality information at a receiving terminal according to at least one example embodiment.

Referring to FIG. 4, in operation 410, the receiving terminal 200 may receive an encoded call signal and bandwidth information on the call signal from the transmitting terminal 100 through the communicator 210. The encoded call signal and the bandwidth information may be one transmitted in operation 350 of FIG. 3. That is, the call signal that is a signal generated by (re)sampling an input signal input through the inputter 140 associated with the transmitting terminal 100 at a predetermined (or, alternatively, desired) reference sampling rate and by encoding the (re) sampled input signal and the bandwidth information that is determined based on the reference sampling rate and the sampling rate supported by the inputter 140 may be received at the receiving terminal 200. The encoded call signal and the bandwidth information may be distinguishably described, however, may be information that is received at a time. Alternatively, the encoded call signal may include the bandwidth information.

In operation 420, the decoder 224 may decode the received call signal at a predetermined (or, alternatively, desired) reference sampling rate. The reference sampling rate may be determined based on at least one of performance of the receiving terminal 200 and a setting by a service provider providing a call between the transmitting terminal 100 and the receiving terminal 200. That is, the reference sampling rate of the receiving terminal 200 may be set in a manner similar to the aforementioned method of determining the reference sampling rate of the receiving terminal 200 in FIG. 3. The reference sampling rate of the receiving terminal 200 of FIG. 4 may be identical to or different from the reference sampling rate of the receiving terminal 200 of FIG. 3. The reference sampling rate may be individually set or determined with respect to the transmitting terminal 100 or the receiving terminal 200.

In operation 430, the resampler 226 may resample the decoded call signal at the sampling rate supported by the outputter 250 associated with the receiving terminal 200. By performing operation 430, the call signal may be appropriately output through the outputter 250.

Resampling of operation 430 may be performed when the sampling rate supported by the outputter 250 is determined to be different from the reference sampling rate of the receiving terminal 200.

In operation 440, the call quality information generator 228 may generate call quality information based on at least one of the received bandwidth information, the reference sampling rate of the receiving terminal 200, and the sampling rate supported by the outputter 250.

Here, when the sampling rate supported by the outputter 250 is different from the reference sampling rate of the receiving terminal 200, the generated call quality information may include information on a minimum bandwidth among a first bandwidth represented by the bandwidth information, a second bandwidth indicated by a first reference sampling rate of the receiving terminal 200, and a third bandwidth indicated by the sampling rate supported by the outputter 250.

Alternatively, when the sampling rate supported by the outputter 250 is identical to the reference sampling rate of the receiving terminal 200, the call quality information may include information on a relatively smaller bandwidth between the first bandwidth and the second bandwidth.

The first bandwidth may be a relatively smaller bandwidth between the bandwidth indicated by the reference sampling rate of the transmitting terminal 100 and the bandwidth indicated by the sampling rate supported by the inputter 140.

That is, the bandwidth used for the call may be determined based on the minimum bandwidth among the (maximum) bandwidth that is actually supported at the call service, the (maximum) bandwidth supported by the transmitting terminal 100, and the (maximum) bandwidth supported by the receiving terminal 200. Accordingly, call quality information generated in the example embodiment may clearly represent information on the bandwidth actually used for the call.

In operation 450, the call signal resampled at the sampling rate supported by the outputter 250 may be transmitted to the outputter 250 and output through the outputter 250. Accordingly, the user of the receiving terminal 200 may hear voice from the user of the transmitting terminal 100 through the outputter 250.

In operation 460, the display 230 may display the call quality information generated in operation 440. The displayed call quality information may include information on a call quality associated with the bandwidth used for the call between the transmitting terminal 100 and the receiving terminal 200.

For example, the display 230 may display that a call between the transmitting terminal 100 and the receiving terminal 200 is being performed using a bandwidth of a wideband (WB), a super-wideband (SWB), or a full band (FB). Also, the display 230 may display that the call is being performed using the wideband due to performance/specifications of the transmitting terminal 100 or the receiving terminal 200 or performance/specifications of the inputter or the outputter thereof, although the call function supports the bandwidth of the full band (or although the bandwidth indicated by the reference sampling rate of the transmitting terminal 100 and the receiving terminal 200 is the full band.

According to example embodiments, when performing a call between the transmitting terminal 100 and the receiving terminal 200, accurate call quality information based on specifications and characters of each terminal and a microphone/speaker used by each terminal for the call may be provided to callers and information on an accurate bandwidth used for the call may be provided to the callers. Information on a device that causes a degradation in the call quality may be provided to the callers. Accordingly, the callers may receive further accurate call quality information compared to call quality information merely based on a state of a network.

A method of displaying call quality information is further described with reference to FIG. 8.

Description related to technical features made above with reference to FIGS. 1 to 3 may apply to FIG. 4 and accordingly, further description is omitted.

FIG. 5 is a flowchart illustrating an example of a method of providing call quality information at a receiving terminal according to at least one example embodiment.

Hereinafter, a method of generating call quality information without performing resampling when a sampling rate supported by the outputter 250 of the receiving terminal 200 is identical to a reference sampling rate of the receiving terminal 200 is described with reference to FIG. 5.

Referring to FIG. 5, in operation 510, once decoding of operation 420 of FIG. 4 is performed, the receiving terminal 200 may compare the sampling rate supported by the outputter 250 to the reference sampling rate of the receiving terminal 200.

When the sampling rate supported by the outputter 250 is different from the reference sampling rate of the receiving terminal 200, resampling of operation 430 of FIG. 4 may be performed.

When the sampling rate supported by the outputter 250 is identical to the reference sampling rate of the receiving terminal 200, resampling of operation 430 may not be performed. In operation 520, the call quality information generator 228 may generate call quality information based on bandwidth information received from the transmitting terminal 100 and the reference sampling rate of the receiving terminal 200. That is, when the sampling rate supported by the outputter 250 is identical to the reference sampling rate of the receiving terminal 200, a resampling process using the sampling rate supported by the outputter 250 through the resampler 226 may be omitted.

Description related to technical features made above with reference to FIGS. 1 to 4 may apply to FIG. 5 and accordingly, further description is omitted.

Figure 6A:
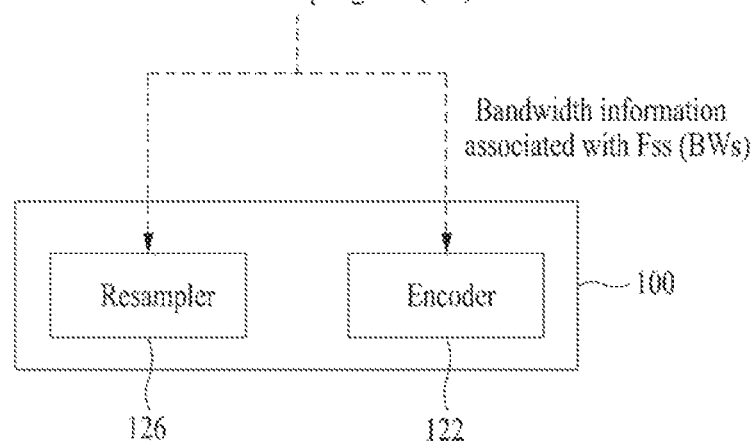
FIGS. 6A to 6C illustrate an example of an operation method of a transmitting terminal that performs a call to provide call quality information according to at least one example embodiment.
Figure 6B:
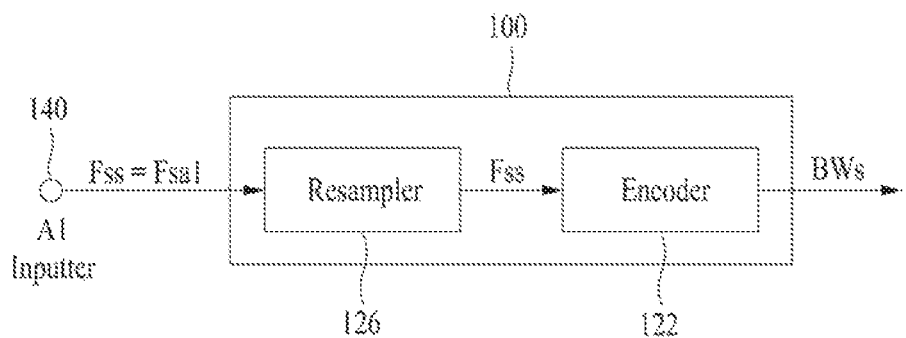
Figure 6C:
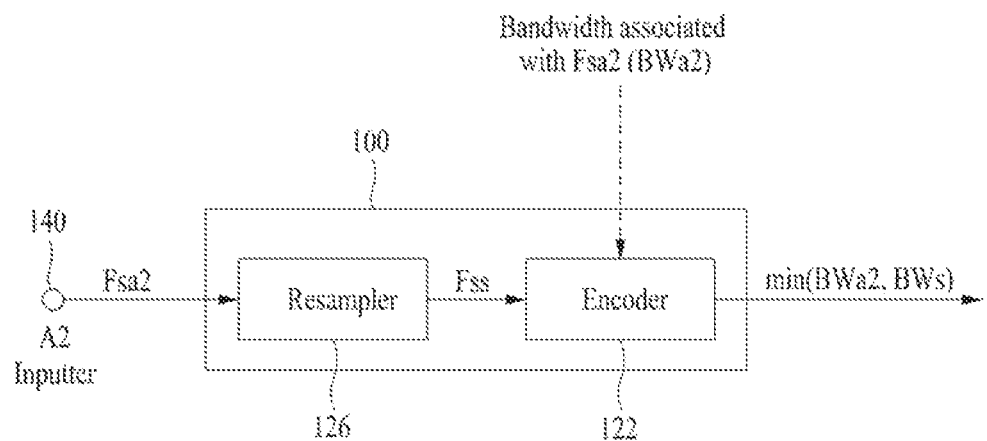

FIGS. 6A to 6C illustrate an example of an operation method of a transmitting terminal that performs a call to provide call quality information according to at least one example embodiment.

Hereinafter, an operation of the transmitting terminal 100 is described with reference to FIGS. 6A to 6C.

Referring to FIG. 6A, a reference sampling rate of the transmitting terminal 100 described above with FIG. 3 is indicated with Fss. The reference sampling rate (Fss) may be transmitted to the resampler 126 and the encoder 122. The resampler 126 may receive an input signal from the inputter 140 and may resample the input signal at the reference sampling rate (Fss). Information on a bandwidth (BWs) indicated by the reference sampling rate (Fss) may be set to the encoder 122.

An example in which a sampling rate (Fsa1) supported by the inputter 140 is identical to a reference sampling rate (Fss) of the transmitting terminal 100 is described with reference to FIG. 6B. The resampler 126 may resample the input signal from the inputter 140 at the reference sampling rate (Fss) and the encoder 122 may encode the resampled signal at the reference sampling rate (Fss). Accordingly, the encoded call signal and bandwidth information on the corresponding call signal may be output to the receiving terminal 200. The bandwidth information on the call signal that is output from the transmitting terminal 100 may include information on a bandwidth (BWs) indicated by the reference sampling rate (Fss).

An example in which the inputter 140 changes from A1 to A2 and a sampling rate (Fsa2) supported by the inputter 140 is different from a reference sampling rate (Fss) of the transmitting terminal 100 is described with reference to FIG. 6C. The resampler 126 may resample an input signal (sampled at the sampling rate (Fsa2)) from the inputter 140 at the reference sampling rate (Fss). Information on a bandwidth (BWa2) indicated by the sampling rate (Fsa2), for example, a maximum bandwidth according to the sampling rate (Fsa2) may be set to the encoder 122. The encoder 122 may encode the signal that is resampled at the reference sampling rate (Fss). Accordingly, the encoded call signal and bandwidth information on the corresponding call signal may be output to the receiving terminal 200. Here, bandwidth information on the call signal that is output from the transmitting terminal 100 may include information on a relatively smaller bandwidth (min(BWa2, BWs)) between the bandwidth (BWs) indicated by the reference sampling rate (Fss) and the bandwidth (BWa2) indicated by the sampling rate (Fsa2).

As described above with reference to FIGS. 6A to 6C, the encoded call signal and the bandwidth information on the corresponding call signal used to provide call quality information may be transmitted from the transmitting terminal 100 to the receiving terminal 200.

Description related to technical features made above with reference to FIGS. 1 to 5 may apply to FIGS. 6A to 6C and accordingly, further description is omitted.

Figure 7A:
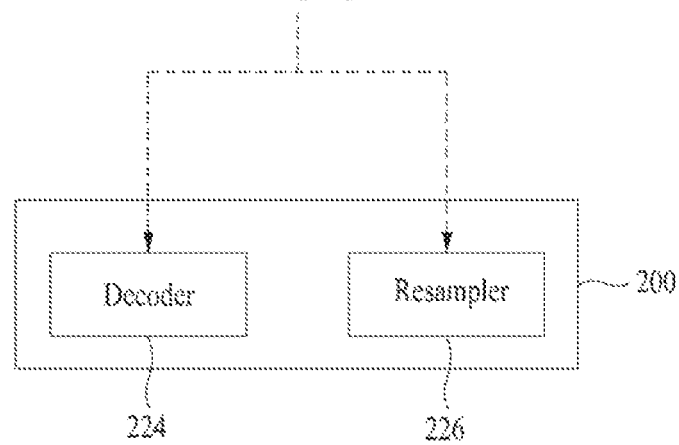
FIGS. 7A to 7C illustrate an example of an operation method of a receiving terminal that performs a call to provide call quality information according to at least one example embodiment.
Figure 7B:
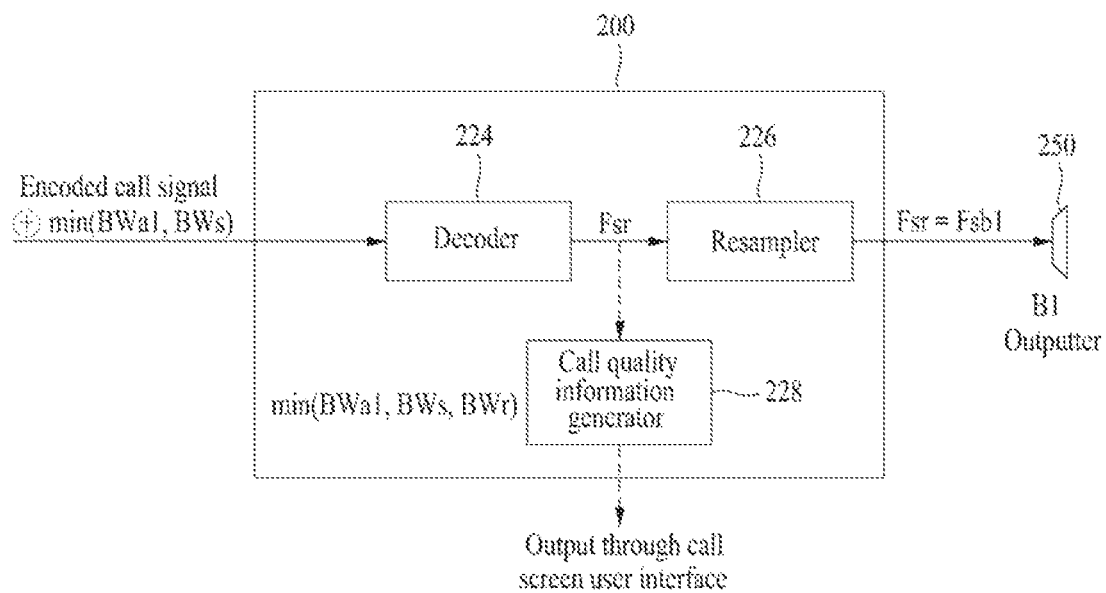
Figure 7C:
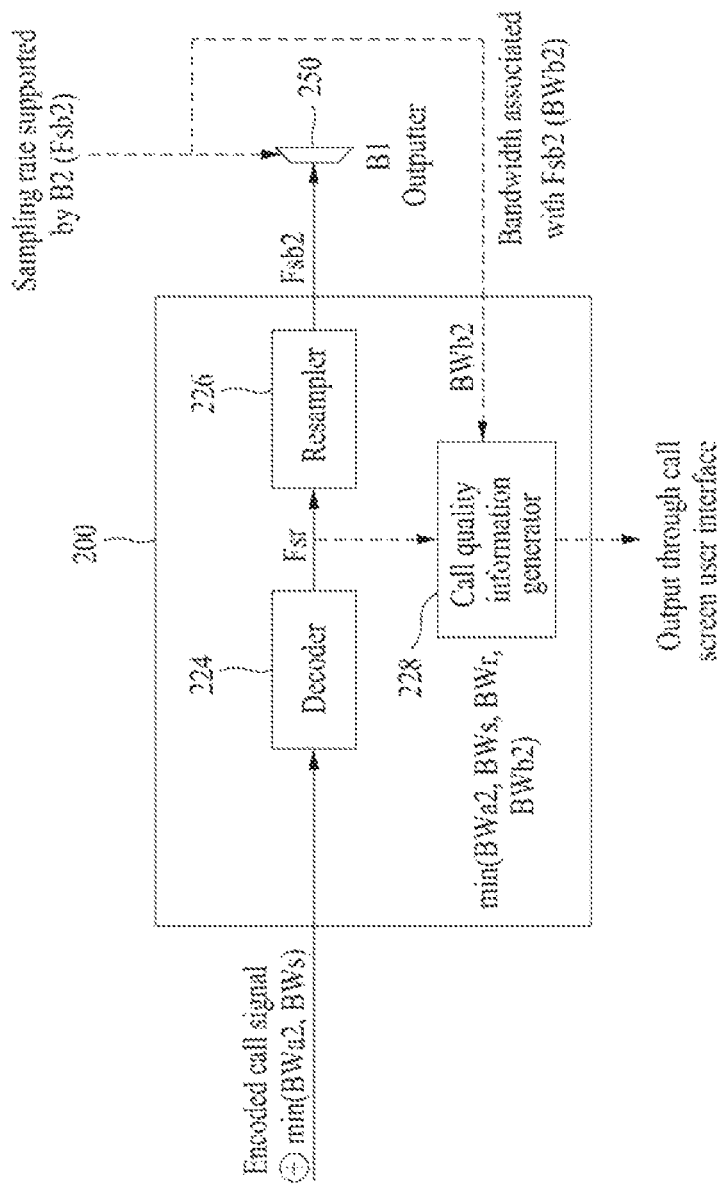

FIGS. 7A to 7C illustrate an example of an operation method of a receiving terminal that performs a call to provide call quality information according to at least one example embodiment.

Hereinafter, an operation of the receiving terminal 200 is described with reference to FIGS. 7A to 7C.

Referring to FIG. 7A, a reference sampling rate of the receiving terminal 200 described above with reference to FIG. 4 is indicated with Fsr. The preset reference sampling rate (Fsr) may be transmitted to the resampler 226 and the decoder 224. The decoder 224 may decode a call signal received from the transmitting terminal 100. The decoder 224 may decode the call signal received from the transmitting terminal 100 at the reference sampling rate (Fsr). The resampler 226 may resample the decoded call signal at a sampling rate supported by the outputter 250.

An example in which a sampling rate (Fsb1) supported by the outputter 250 is identical to a reference sampling rate (Fsr) of the receiving terminal 200 is described with reference to FIG. 7B. The decoder 224 may decode the call signal received from the transmitting terminal 100 at the reference sampling rate (Fsr). The resampler 126 may resample the decoded call signal at the sampling rate (Fsb1) supported by the outputter 250. The resampled call signal may be transmitted to the outputter 250 and output through the outputter 250. The resampled call signal may be converted to an analog signal and thereby output through the outputter 250. The call quality information generator 228 may generate call quality information by comparing bandwidth information (min(BWa1, BWs)) received from the transmitting terminal 100 and a bandwidth (BWr) indicated by the reference sampling rate (Fsr). That is, the call quality information generator 228 may generate the call quality information by determining a minimum value (min(BWa1, BWs, BWr)) among BWa1, BWs, and BWr as a bandwidth used for a call.

The generated call quality information may be output through a call screen user interface of the receiving terminal 200 by the display 230.

Hereinafter, an example in which the outputter 250 changes from B1 to B2 and a sampling rate (Fsb2) supported by the outputter 250 is different from a reference sampling rate (Fsr) of the receiving terminal 200 is described with reference to FIG. 7C. In this case, the resampler 126 may resample a decoded call signal at the sampling rate (Fsb2) supported by the outputter 250. The resampled call signal may be transmitted to the outputter 250 and thereby output through the outputter 250. The sampling rate (Fsb2) or a bandwidth (BWb2) indicated by the sampling rate (Fsb2), for example, a maximum bandwidth according to the sampling rate (Fsb2), may be transmitted to the call quality information generator 228. The call quality information generator 228 may generate call quality information by comparing bandwidth information (min(BWa2, BWs)) received from the transmitting terminal 100, the bandwidth (BWr) indicated by the reference sampling rate (Fsr), and the bandwidth (BWb2) indicated by the sampling rate (Fsb2). That is, the call quality information generator 228 may generate call quality information by determining a minimum value (min(BWa2, BWs, BWr, BWb2)) among BWa2, BWs, BWr, and BWb2 as a bandwidth used for a call. The generated call quality information may be displayed through a call screen user interface of the receiving terminal 200 by the display 230.

As described above with reference to FIGS. 7A to 7C, call quality information may be generated and displayed.

In the example embodiments, when performing a call between the transmitting terminal 100 and the receiving terminal 200, information on an actual bandwidth used for a call based on specifications and characteristics of each terminal or a microphone/speaker used by each terminal for the call may be provided to callers as call quality information. Also, in response to the transmitting terminal 100 or the receiving terminal 200 switching a general call to a speaker phone call or switching the speaker phone call to the general call during a call, that is, in response to the inputter 140 changing from A1 to A2 or the outputter 250 changing from B1 to B2, a bandwidth used for the call may be changed, which may cause a degradation in the call quality. Even in this case, information on the change in the call quality may be accurately transmitted to the callers.

Description related to technical features made above with reference to FIGS. 1 to 6 may apply to FIG. 7 and accordingly, further description is omitted.

Figure 8:
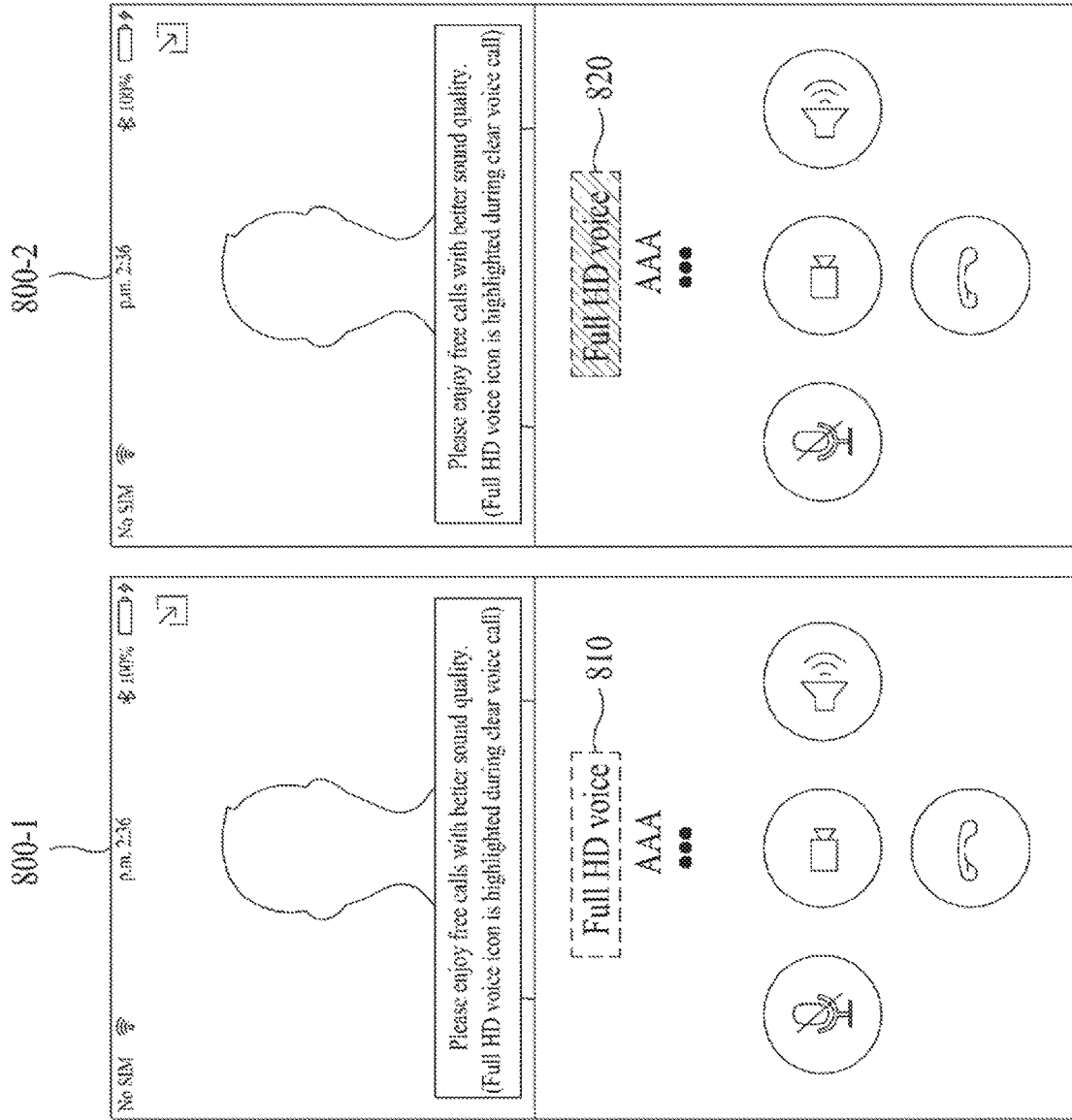
FIG. 8 illustrates an example of a method of displaying call quality information on a user terminal that performs a call according to at least one example embodiment.

FIG. 8 illustrates an example of a method of displaying call quality information on a user terminal that performs a call according to at least one example embodiment.

Referring to FIG. 8, screens 800-1 and 800-2 show examples in which call quality information generated in the aforementioned example embodiments is displayed through a call screen user interface of the receiving terminal 200 or the transmitting terminal 100.

The screen 800-1 refers to the call screen user interface when a call is being performed in a relatively low bandwidth, and the screen 800-2 refers to the call screen user interface when a call is being performed in a relatively high bandwidth.

When the call is determined to be performed in a high bandwidth, for example, a full band, a color of text "Full HD voice" may be changed or highlighted. That is, a caller may identify whether a call is being performed using a high bandwidth or a low bandwidth by comparing the displayed texts "Full HD voice" 810 and 820.

Although not illustrated, a text "the call is being made using a full band (or a super-wideband)" may be displayed through a user interface based on a bandwidth that is determined to be used for the call.

Also, a cause of degradation in the call quality may be displayed through the user interface as call quality information, such as, for example, "Full band (or super-wideband) is unavailable because of your/the other party's microphone/speaker".

Description related to technical features made above with reference to FIGS. 1 to 7 may apply to FIG. 8 and accordingly, further description is omitted.

Figure 9:
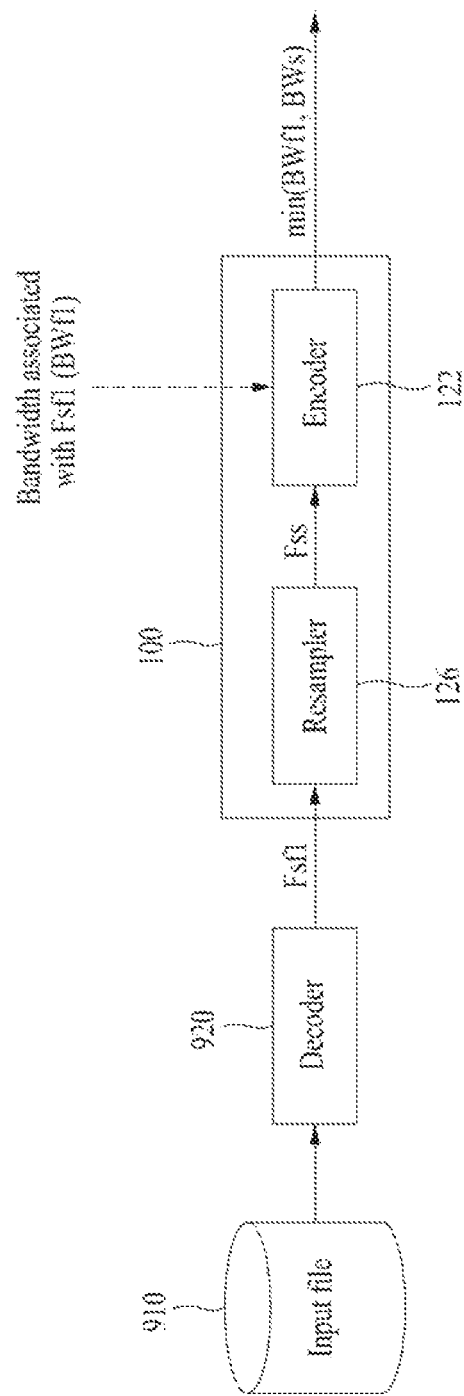
FIG. 9 illustrates an example of a method of generating an encoded call signal output from a transmitting terminal based on content prestored in the transmitting terminal according to at least one example embodiment.
Figure 10:
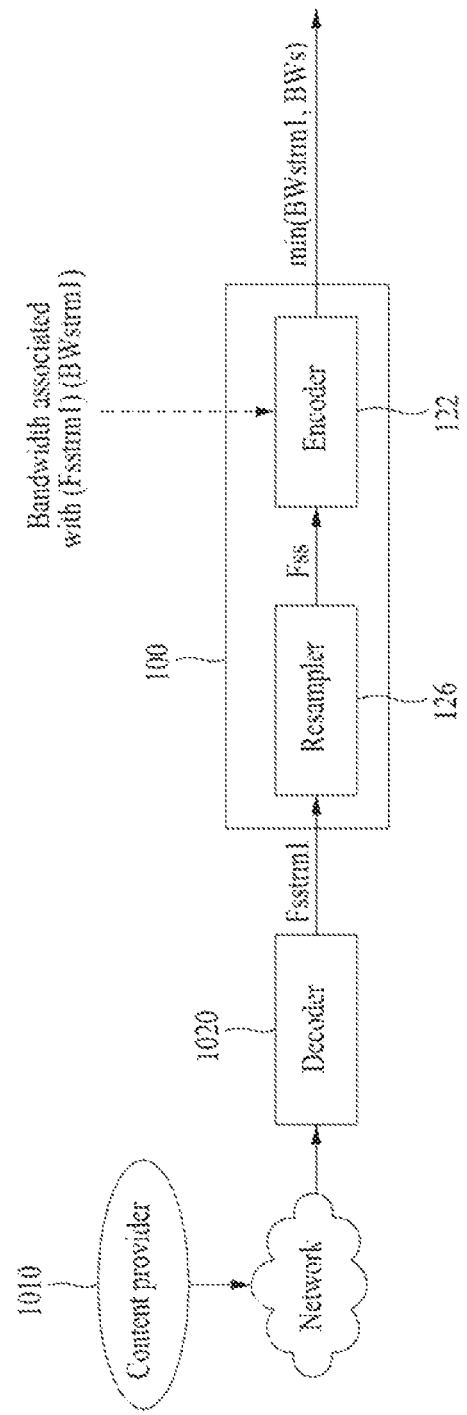
FIG. 10 illustrates an example of a method of generating an encoded call signal output from a transmitting terminal based on content provided from a content provider according to at least one example embodiment.

FIG. 9 illustrates an example of a method of generating an encoded call signal output from a transmitting terminal based on content prestored in the transmitting terminal according to at least one example embodiment, and FIG. 10 illustrates an example of a method of generating an encoded call signal output from a transmitting terminal based on content provided from a content provider according to at least one example embodiment.

Hereinafter, an example embodiment in which a call signal output through the transmitting terminal 100 is based on content prestored in the transmitting terminal 100 or content provided to the transmitting terminal 100 through an external content provider, instead of using a signal input through the inputter 140 is described with reference to FIGS. 9 and 10.

The content may be a file that constitutes, for example, audio content or video content. For example, the content may be a file with an extension of mp3, acc, way, or avi. Alternatively, the content may be audio streaming content or video streaming content.

Hereinafter, a method of generating an encoded call signal output from the transmitting terminal 100 based on content prestored in the transmitting terminal 100 is described.

An input file 910 may be content that is prestored in the transmitting terminal 100. Alternatively, the input file 910 may be content that is prestored in a cloud server associated with the transmitting terminal 100.

The input file 910 may be decoded using a decoder 920. The decoder 920 may decode the input file 910 at a predetermined (or, alternatively, desired) sampling rate. The sampling rate may be determined based on specifications or characteristics of the decoder 920, or may be set by the user of the transmitting terminal 100. Alternatively, the sampling rate may be determined as a sampling rate supported by the input file 910 that is decoded. Although the sampling rate is indicated with the same reference numeral as that of a sampling rate (Fsf1) supported by the inputter 140, the sampling rate may have a value different from the sampling rate supported by the inputter 140.

The decoder 920 may be the decoder 124 of the transmitting terminal 100, or may be a decoder present in an external device or a server.

The resampler 126 may resample the input file 910 that is decoded at the sampling rate (Fsf1), at a reference sampling rate (Fss). Information on a bandwidth (BWf1) indicated by the sampling rate (Fsf1), for example, a maximum bandwidth according to the sampling rate (Fsf1), may be set to the encoder 122. The encoder 122 may encode the content resampled at the reference sampling rate (Fss), that is, the content corresponding to the input file 910.

Accordingly, the encoded content as an encoded call signal and bandwidth information on the corresponding call signal, that is, the encoded content, may be output to the receiving terminal 200. Here, the bandwidth information output from the transmitting terminal 100 may include a relatively smaller bandwidth (min(BWf1, BWs)) between the bandwidth (BWs) indicated by the reference sampling rate (Fss) and the bandwidth (BWf1) indicated by the sampling rate (Fsf1).

According to the example embodiment of FIG. 9, the user of the transmitting terminal 100 may transmit content being maintained by the user to the receiving terminal 200 that is a counterpart of a call, and corresponding callers may receive further accurate call quality information (and a change in the call quality) used for such content transmission.

Hereinafter, a method of generating an encoded call signal output from the transmitting terminal 100 based on content provided from an external content provider 1010 is described with reference to FIG. 10.

The content provider 1010 may be a server of a service provider that provides audio streaming content and/or video streaming content, or may be a cloud server associated with the transmitting terminal 100.

The content provider 1010 may provide the audio streaming content or the video streaming content to the transmitting terminal 100 over a network.

The content provided from the content provider 1010 may be decoded through a decoder 1020. The decoder 1020 may decode the content at a predetermined (or, alternatively, desired) sampling rate (Fsstrm1). The sampling rate (Fsstrm1) may be determined based on specifications or characteristics of the decoder 1020, or may be set by the user of the transmitting terminal 100. Alternatively, the sampling rate may be determined as a sampling rate supported by the content that is decoded.

The decoder 1020 may be the decoder 124 of the transmitting terminal 100, or may be a decoder of the content provider 1010.

The resampler 126 may resample the content that is decoded at the sampling rate (Fsstrm1), at a reference sampling rate (Fss). Information on a bandwidth (BWstrm1) indicated by the sampling rate (Fsstrm1), for example, a maximum bandwidth according to the sampling rate (Fsstrm1), may be set to the encoder 122. The encoder 122 may encode the content that is resampled at the reference sampling rate (Fss).

Accordingly, the encoded content as an encoded call signal and bandwidth information on the corresponding call signal, that is, the encoded content may be output to the receiving terminal 200. Here, the bandwidth information output from the transmitting terminal 100 may include information on a relatively smaller bandwidth (min(BWstrm1, BWs)) between the bandwidth (BWs) indicated by the reference sampling rate (Fss) and the bandwidth (BWstrm1) indicated by the sampling rate (Fsstrm1).

According to the example embodiment of FIG. 10, the user of the transmitting terminal 100 may transmit content provided through the external content provider 1010, such as content being streamed or desired to recommend by the user of the transmitting terminal 100, to the receiving terminal 200 that is a counterpart of a call, and corresponding callers may receive further accurate call quality information (and a change in the call quality) used for such content transmission.

Description related to technical features made above with reference to FIGS. 1 to 8 may apply to FIGS. 9 and 10 and accordingly, further description is omitted.

In the aforementioned example embodiments, operations performed by the terminals 100 and 200, and components thereof may be performed by a server. That is, at least a portion of operations performed by a client, that is, the terminal 100, 200 may also be performed on the side of the server. For example, functions and operations of the call quality information generator 128, 228 may be configured on the side of the server.

On the contrary, at least a portion of operations performed on the side of the server may be performed on the side of the client.

The systems and/or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable record media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable record media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
by a receiving terminal,
receiving an encoded call signal and bandwidth information on the encoded call signal from a transmitting terminal;
decoding the received encoded call signal at a first reference sampling rate;
resampling the decoded call signal at a sampling rate supported by an outputter that is included in or connected to the receiving terminal to output the resampled call signal from the receiving terminal; and
generating call quality information based on at least one of the bandwidth information, the first reference sampling rate, and the sampling rate supported by the outputter, wherein
the encoded call signal is a signal having been generated by sampling an input signal input through an inputter, included in or connected to the transmitting terminal to input the input signal to the transmitting terminal, at a second reference sampling rate and by encoding the sampled input signal, and
the bandwidth information is based on the second reference sampling rate and a sampling rate supported by the inputter.

2. A method comprising:
by a receiving terminal,
receiving an encoded call signal and bandwidth information on the encoded call signal from a transmitting terminal;
decoding the received encoded call signal at a first reference sampling rate;
resampling the decoded call signal at a sampling rate supported by an outputter that is included in or connected to the receiving terminal to output the resampled call signal from the receiving terminal; and
generating call quality information based on at least one of the bandwidth information, the first reference sampling rate, and the sampling rate supported by the outputter, wherein
the encoded call signal is a signal having been generated by decoding content prestored in the transmitting terminal or provided from an external content provider to the transmitting terminal, sampling the decoded content at a second reference sampling rate, and encoding the sampled content, and
the bandwidth information is based on the second reference sampling rate and a sampling rate at which the content is decoded.

3. The method of claim 1, wherein the bandwidth information comprises information on a smaller bandwidth between a bandwidth indicated by the second reference sampling rate and a bandwidth indicated by the sampling rate supported by the inputter.

4. The method of claim 1, wherein the bandwidth information comprises information regarding a wideband (WB), information regarding a super-wideband (SWB), or information regarding a full band (FB).

5. A method comprising:
by a receiving terminal,
receiving an encoded call signal and bandwidth information on the encoded call signal from a transmitting terminal;
decoding the received encoded call signal at a first reference sampling rate;
resampling the decoded call signal at a sampling rate supported by an outputter that is included in or connected to the receiving terminal to output the resampled call signal from the receiving terminal; and
generating call quality information based on at least one of the bandwidth information, the first reference sampling rate, and the sampling rate supported by the outputter, wherein,
when the sampling rate supported by the outputter is different from the first reference sampling rate, the call quality information comprises information on a minimum bandwidth among a first bandwidth indicated by the bandwidth information, a second bandwidth indicated by the first reference sampling rate, and a third bandwidth indicated by the sampling rate supported by the outputter, and
when the sampling rate supported by the outputter is identical to the first reference sampling rate, the call quality information comprises information on a smaller bandwidth between the first bandwidth and the second bandwidth.

6. The method of claim 1, further comprising:
by the receiving terminal,
outputting the resampled call signal through the outputter; and
displaying the call quality information,
wherein the displayed call quality information comprises information on a call quality related to a bandwidth used for a call between the transmitting terminal and the receiving terminal.

7. A method comprising:
by a receiving terminal,
receiving an encoded call signal and bandwidth information on the encoded call signal from a transmitting terminal;
decoding the received encoded call signal at a first reference sampling rate;
determining whether a sampling rate supported by an outputter that is included in or connected to the receiving terminal is different from the first reference sampling rate;
in response to the determining that the sampling rate supported by the outputter is different from the first reference sampling rate,
resampling the decoded call signal at the sampling rate supported by the outputter, and
generating call quality information based on at least one of the bandwidth information, the first reference sampling rate, and the sampling rate supported by the outputter.

8. The method of claim 1, wherein the first reference sampling rate is based on at least one of a performance of the receiving terminal and a setting of a service provider that provides a call between the transmitting terminal and the receiving terminal.

9. A non-transitory computer-readable record medium storing instructions that, when executed by a processor, cause the processor to perform the method of claim 1.

10. An electronic device of comprising:
at least one memory; and
at least one processor, coupled to the at least one memory, to perform a process comprising:
receiving an encoded call signal and bandwidth information on the encoded call signal from a transmitting terminal;
decoding the received encoded call signal at a first reference sampling rate;
resampling the decoded call signal at a sampling rate supported by an outputter that is associated with the electronic device to output the resampled call signal from the electronic device; and
generating call quality information based on at least one of the bandwidth information, the first reference sampling rate, and the sampling rate supported by the outputter, wherein
the received encoded call signal is a signal having been generated by sampling an input signal input through an inputter, included in or connected to the transmitting terminal to input the input signal to the transmitting terminal, at a second reference sampling rate and by encoding the sampled input signal, and
the bandwidth information is based on the second reference sampling rate and a sampling rate supported by the inputter.

11. An electronic device comprising:
at least one memory; and
at least one processor, coupled to the at least one memory, to perform a process comprising:
receiving an encoded call signal and bandwidth information on the encoded call signal from a transmitting terminal;
decoding the received encoded call signal at a first reference sampling rate;
resampling the decoded call signal at a sampling rate supported by an outputter that is associated with the electronic device to output the resampled call signal from the electronic device; and
generating call quality information based on at least one of the bandwidth information, the first reference sampling rate, and the sampling rate supported by the outputter, wherein
the received encoded call signal is a signal having been generated by decoding content prestored in the transmitting terminal or provided from an external content provider to the transmitting terminal, sampling the decoded content at a second reference sampling rate, and encoding the sampled content, and
the bandwidth information is based on the second reference sampling rate and a sampling rate at which the content is decoded.

12. The electronic device of claim 10, wherein:
the process further comprises outputting the resampled call signal through the outputter,
the electronic device further comprises a display configured to display the call quality information, and
the displayed call quality information comprises information on a call quality related to a bandwidth used for a call between the transmitting terminal and the receiving terminal.

13. An electronic device comprising:
at least one memory; and
at least one processor, coupled to the at least one memory, to perform a process comprising:
receiving an encoded call signal and bandwidth information on the encoded call signal from a transmitting terminal;
decoding the received encoded call signal at a first reference sampling rate;
resampling the decoded call signal at a sampling rate supported by an outputter that is associated with the electronic device to output the resampled call signal from the electronic device; and
generating call quality information based on at least one of the bandwidth information, the first reference sampling rate, and the sampling rate supported by the outputter, wherein,
when the sampling rate supported by the outputter is different from the first reference sampling rate, the generating generates, as the call quality information, information on a minimum bandwidth among a first bandwidth indicated by the bandwidth information, a second bandwidth indicated by the first reference sampling rate, and a third bandwidth indicated by the sampling rate supported by the outputter, and
when the sampling rate supported by the outputter is identical to the first reference sampling rate, the generating generates, as the call quality information, information on a smaller bandwidth between the first bandwidth and the second bandwidth.

14. The electronic device of claim 10, wherein the first reference sampling rate is based on at least one of a performance of the receiving terminal and a setting of a service provider that provides a call between the transmitting terminal and the receiving terminal.

15. A method comprising:
by a transmitting terminal,
resampling an input signal at a reference sampling rate, wherein
the input signal having been received by the transmitting terminal from an inputter, included in or connected to the transmitting terminal to input the input signal to the transmitting terminal, and then, prior to the resampling, having been sampled at a sampling rate supported by the inputter, or
the input signal having been generated by decoding content prestored in the transmitting terminal or provided from an external content provider to the transmitting terminal;
encoding the resampled input signal; and
transmitting, to a receiving terminal, the encoded input signal and bandwidth information, wherein
when the input signal was received by the transmitting terminal from the inputter and then, prior to the resampling, was sampled at the sampling rate supported by the inputter, the bandwidth information is based on the reference sampling rate and the sampling rate supported by the inputter,
when input signal was generated by decoding content prestored in the transmitting terminal or provided from an external content provider to the transmitting terminal, the bandwidth information is based on a sampling rate at which the content was decoded, and
the encoded input signal and the bandwidth information transmitted to the receiving terminal are for use by the receiving terminal to generate information on a call quality related to a bandwidth used for a call between the transmitting terminal and the receiving terminal.

16. The method of claim 15, wherein
when the input signal was received by the transmitting terminal from the inputter and then, prior to the resampling, was sampled at the sampling rate supported by the inputter, the bandwidth information comprises information on a smaller bandwidth between a bandwidth indicated by the reference sampling rate and a bandwidth indicated by the sampling rate supported by the inputter, and
when input signal was generated by decoding content prestored in the transmitting terminal or provided from an external content provider to the transmitting terminal, the bandwidth information comprises the sampling rate at which the content is decoded.

* * * * *